(12) United States Patent  
Koike

(10) Patent No.: US 6,322,225 B1
(45) Date of Patent: Nov. 27, 2001

(54) LIGHT SCATTERING GUIDING LIGHT SOURCE DEVICE AND LIQUID CRYSTAL DISPLAY

(75) Inventor: Yasuhiro Koike, Yokohama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 08/702,855

(22) Filed: Aug. 26, 1996

Related U.S. Application Data

(63) Continuation of application No. 08/356,121, filed on Dec. 15, 1994, now abandoned.

(30) Foreign Application Priority Data

Dec. 17, 1993 (JP) .................................................. 5-343877

(51) Int. Cl.[7] ........................................................ G02B 6/26
(52) U.S. Cl. ............................. 362/31; 362/26; 362/329; 362/330
(58) Field of Search ........................... 359/48, 49, 50; 362/26, 27, 30, 31, 23, 329, 330, 327; 349/62, 63, 64, 65; 385/901, 123

(56) References Cited

U.S. PATENT DOCUMENTS

| | | | |
|---|---|---|---|
| 4,277,817 | * | 7/1981 | Hehr ........................................ 362/31 |
| 4,729,067 | * | 3/1988 | Ohe ......................................... 362/26 |
| 4,794,492 | * | 12/1988 | Vinther ................................... 362/31 |
| 4,914,553 | * | 4/1990 | Hamada et al. ..................... 362/31 X |
| 5,093,765 | * | 3/1992 | Kashima et al. ....................... 362/31 |
| 5,211,463 | * | 5/1993 | Kalmanash ............................. 362/26 |
| 5,402,324 | * | 3/1995 | Yokoyama et al. ..................... 362/31 |
| 5,467,417 | * | 11/1995 | Nakamura et al. ................ 362/31 X |
| 5,548,670 | | 8/1996 | Koike . |

FOREIGN PATENT DOCUMENTS

| | | |
|---|---|---|
| 51-89888 | 7/1976 | (JP) . |
| 62-235905 | 10/1987 | (JP) . |
| 63-63083 | 3/1988 | (JP) . |
| 1-172801 | 7/1989 | (JP) . |
| 2-13925 | 1/1990 | (JP) . |
| 2-221924 | 9/1990 | (JP) . |
| 2-221925 | 9/1990 | (JP) . |
| 2-221926 | 9/1990 | (JP) . |
| 2-245787 | 10/1990 | (JP) . |
| 3-207743 | 9/1991 | (JP) . |
| 3-294348 | 12/1991 | (JP) . |
| 4-145485 | 5/1992 | (JP) . |
| WO 93/06509 | 9/1992 | (WO) . |

OTHER PUBLICATIONS

U.S. application No. 08/857,541, Koike, filed May 16, 1997.

* cited by examiner

Primary Examiner—Thomas M. Sember
(74) Attorney, Agent, or Firm—Staas & Halsey LLP

(57) ABSTRACT

A light scattering guiding light source device with a good directionality, having a simplified construction and usable for a backlight source of a liquid crystal display device and the like. A fluorescent lamp is arranged on one lateral surface side of a wedge shaped light scattering guide of an emitting directionality. A light emitting direction correcting element having a line shaped prism face is disposed on a light output surface side of the light scattering guide. A surface light source device using a flat surface of the light emitting direction correcting element as a brightened light can be obtained. Any particular treatment for producing an intensive light scattering such as a light dispersing ink pattern or an irregular diffusing surface or the like, is not provided on a back surface of the light scattering guide. A silver foil sheet is arranged opposing the back surface as a reflection portion having a regular reflection property. Thereby, a light which is emitted along the light output surface is reduced and a directionality of an illuminating light flux is improved. In addition, the liquid crystal display panel arranged on the upper portion provides a liquid crystal display device having a display quality which is particularly graded viewed from a front observing direction.

2 Claims, 11 Drawing Sheets

| Ang. | 70 | 60 | 50 | 40 | 30 | 20 | 10 | 0 | -10 | -20 | -30 | -40 | -50 | -60 | -70 |
|---|---|---|---|---|---|---|---|---|---|---|---|---|---|---|---|
| Lum. | 1030.0 | 1104.0 | 1093.0 | 1066.0 | 970.0 | 1106.0 | 1819.0 | 2231.0 | 1952.0 | 1229.0 | 908.0 | 1047.0 | 1051.0 | 1042.0 | 970.0 |
| % | 46.2 | 49.5 | 49.0 | 47.8 | 43.5 | 49.6 | 81.5 | 100.0 | 87.5 | 55.1 | 40.7 | 46.9 | 47.1 | 46.7 | 43.5 |

| Ang. | 70 | 60 | 50 | 40 | 30 | 20 | 10 | 0 |
|---|---|---|---|---|---|---|---|---|
| Lum. | 798.0 | 710.0 | 556.0 | 505.0 | 610.0 | 1108.0 | 2128.0 | 2717.0 |
| % | 29.4 | 26.1 | 20.5 | 18.6 | 22.5 | 40.8 | 78.3 | 100.0 |

| Ang. | -10 | -20 | -30 | -40 | -50 | -60 | -70 |
|---|---|---|---|---|---|---|---|
| Lum. | 2248.0 | 1180.0 | 549.0 | 444.0 | 436.0 | 513.0 | 559.0 |
| % | 82.7 | 43.4 | 20.2 | 16.3 | 16.0 | 18.9 | 20.6 |

| Ang. | 70 | 60 | 50 | 40 | 30 | 20 | 10 | 0 |
|---|---|---|---|---|---|---|---|---|
| Lum. | 1866.0 | 1946.0 | 1879.0 | 1786.0 | 1621.0 | 1863.0 | 3015.0 | 4234.0 |
| % | 44.1 | 46.0 | 44.4 | 42.2 | 38.3 | 44.0 | 71.2 | 100.0 |

| | -10 | -20 | -30 | -40 | -50 | -60 | -70 |
|---|---|---|---|---|---|---|---|
| | 3964.0 | 2233.0 | 1326.0 | 1562.0 | 1514.0 | 1441.0 | 1277.0 |
| | 93.6 | 52.7 | 31.3 | 36.9 | 35.8 | 34.0 | 30.2 |

| Ang. | 70 | 60 | 50 | 40 | 30 | 20 | 10 | 0 |
|------|------|------|------|------|------|------|------|------|
| Lum. | 2252 | 1959 | 1442 | 1087 | 1200 | 2142 | 4096 | 5163 |
| % | 43.6 | 37.9 | 27.9 | 21.1 | 23.2 | 41.5 | 79.3 | 100.0 |
| | -10 | -20 | -30 | -40 | -50 | -60 | -70 | |
| | 4081 | 1969 | 701 | 512 | 362 | 304 | 221 | |
| | 79.0 | 38.1 | 13.6 | 9.9 | 7.0 | 5.9 | 4.3 | |

LIGHT SCATTERING GUIDING LIGHT SOURCE DEVICE AND LIQUID CRYSTAL DISPLAY

This application is a continuation of application Ser. No. 08/356,121, filed Dec. 15, 1994, now abandoned.

BACKGROUND OF THE INVENTION

1. Technical Field

This invention relates to a light scattering guiding light source device for constituting a surface light source using an optical element (hereinafter referred to as "light scattering guide") which has a function capable of light-guiding an incident light while being scattered in a volume region, and further relates to a liquid crystal display using the light scattering guiding light source device as a backlight source.

2. Description of Related Art

Conventionally, there have been known various kinds of optical elements and devices of types for emitting a light to a desirous direction using its scattering phenomenon, those of which are used for application such as backlight sources of liquid crystal display devices and the like.

One similar type of those known techniques is a surface light-source in that a light is allowed to be incident from a lateral-side of a transparent material of a extending plate shape, whose one surface side is provided with a reflecting element, and whose other surface has a light scattering property and forms a light emitting surface. Such is described in Japanese Patent Application Laid Opens Sho-62-235905 in 1987, Sho-63-63083 in 1988, Hei-2-13925 in 1990, and Hei-2-245787 in 1990.

In the surface light source using such technique, only a light emitting direction is widened using a scattering reflection and mirror reflection caused on a surface of the transparent material and the reflecting element, and not occurrence of the scattering light within the transparent material in three dimensional manner. Therefore, it is difficult in principle to sufficiently raise a rate of output of the scattering light from the light scattering guiding device.

To obtain the surface light source having a uniform illuminance by lateral side incident light, as is easily understood from examples shown in the respective publications listed above, a reflectivity of the reflecting element and the like are required any of tilt. this provides a complicated larger-sized construction of the light scattering guide device together with a higher cost for manufacturing.

Accordingly, in case where such type of light scattering guiding device is used for the backlight source of liquid crystal display and the like, there must have been sacrificed some from among a brightness, a uniformity of illuminance as a surface light-source, a thin type structure, economy and the others.

Another similar type of the known technique is such that particle shaped substance having a refractive index different from the transparent material is diffused inside the extending plate shaped transparent material.

A light diffusing plate, wherein spherical shaped particles made of silicone resin are diffused into the transparent material such as PMMA, is proposed, for example, in Japanese patent Application Laid Opens Hei-1-172801 in 1989, Hei-3-207743 in 1991, and Hei-3-294348 in 1991. The data of a particle size or particle concentration or the like disclosed in those known documents are used to calculate an effective scattering irradiation parameter E, which will be described later, to obtain a value of 210 to 3000.

Such value E can be employed in case of constituting the light diffusing plate on which, in use, a light is incident from the vertical direction. However, the value E is not suitable for an application of the light scattering guide device of a type capable of taking out a uniform illuminanced light from a light output surface having a spread as is the case of the present invention. Even if the light is incident into the known light scattering member from its lateral-side, a function as the light scattering guide, that means "conductively scattering ranging an appreciable distance", substantially is not provided, this results in illuminating locally only a light output surface extremely in vicinity of a light input surface, it is therefore difficult to realize an uniform surface light source, for example, with a practical size (several cm to several tens cm) as a backlight source of the liquid crystal display.

In addition, an attempt to raise a uniformity of brightness of the light output surface includes Japanese Patent Application Laid Opens Hei-2-221924 in 1990, Hei-2-221925 in 1990, and Hei-2-221926 in 1990. Those are to enlarge the particle size and/or particle concentration depending on increase of distance from the light incident surface, and correspond to enlarge an effective scattering irradiation parameter value E depending on increase of the distance from the light incident surface. However, it is not with ease in technique to practically manufacture such a scattering member, this designates unsuccessful mass productivity and disadvantage in economy. For example, the light scattering guide by batch molding by applying an injection molding technique is hardly obtained.

The Japanese Patent Application Laid Open Hei-4-145485 in 1992 also discloses a light source device which is made of a light guide plate where fine particles are provided into the transparent resin member while a treatment for giving a light diffusing property such as a printing pattern is provided on back surface, where is described "an improvement of a brightness by 2 to 10% is achieved for a light emitting surface of the light guide plate without treatment of the light diffusing for the surface, in comparison with a light guide plate (the conventional light guide plate obtained in the market) whose surface does not contain particles which are processed of the light diffusing treatment". In other words, a technical concept shown and described in the document is that a brightness equal to or more than 90% is generated by contribution by the light diffusing process on back side and a brightness rise of remaining several % is achieved by light diffusing by containing the particles.

The technique disclosed in Japanese Utility Model Registration Patent Application Laid Open Sho-51-89888 in 1976 falls into the same technical field, where data relating to the particle size, particle concentration, refractive index of material, or the like are utterly not disclosed, this is established in accordance with an concept that a brightness and illuminance can be obtained only when a layer having a light diffusing property is provided on back surface of an opaque guide containing particles.

In the prior art as hereinbefore described, when using either of transparent or scattering types of guides, a presently decisive idea is that a brightness of the light output surface is raised by more intensively generating the scattering phenomenon centered a backside surface of the guide, furthermore a uniform degree of brightness as a surface light source is secured by applying a stronger or weaker intensity of the scattering power depending on a distance from the light incident-side through any of means.

However, a difficulty resides in realizing a practical size of the surface light source with a simplified construction having a higher uniformity and level of the brightness. The intensive scattering degree for improving the brightness level results in a difficulty to secure a uniformity of the brightness over a wide area, and in requiring an additional construction with a higher cost for giving a gradient on the scattering power.

A problem difficult to be solved in the prior art, is a directionality of the light which is emitted from the light scattering guiding light source device. For example in considering an application of the liquid crystal display device and the like to a display backlight source, an importance is the illuminance viewed from an observing direction (ordinarily, a limited angle range centered a front direction) of the display device, therefore a strong demand is directed in that a light emitted from the light scattering guiding light source device has a directionality matching with the observing direction. However, as in the prior art described, an approach to secure an illuminance by generating the more intensive scattering centered the back surface of the light guide does not give a clear directionality to the light emitted from the light scattering guiding light source device, it has been impossible to realize the light scattering guiding light source device having a directinality matching to the observing direction of the display device.

The specification of Japanese Utility Model Registration Patent Application Laid Open Sho-51-89888 in 1976 as formerly cited teaches that the backlight source of the liquid crystal display is made of an opaque guide member and a silver colored reflection plate arranged on its back surface side, this however has been argued as a large defected arrangement wherein, as is apparent from a countermeasure in the specification intending to solve the defect by diffusion of the light in a multi-direction through a light scattering layer provided on back-surface of the opaque guide, no description is made for an emitting directionality of the guide itself, no proposition is made for a technical problem of emitting a light flux having an exact directionality in the desirous direction, this disclosure is based on a conception in reverse to the proposition of the light scattering guiding light source device for emitting the light having a sufficient directionality.

SUMMARY OF THE INVENTION

An object of the invention is to provide a light scattering guiding light source device capable of giving a practical sized surface light source with a simplified construction which emits a light flux having a clear directionality in a desirous direction. Another object of the invention is to provide a liquid crystal display which is effectively reflected of various features of the light scattering guiding light source device.

A light scattering guiding light source device according to the invention comprises, as its basical construction, a light scattering guide, a light supply means used as a light supply source for the light scattering guide, and a regular reflection means arranged in relation to the light scattering guide. The light scattering guide includes at least one relatively smaller light incident surface region, a relatively larger light output surface region for taking out an emitting light having an incident light as an origin, and a volume region having a uniform a scattering power.

In the light scattering guide used in the invention, a light emitted from its light output surface region has a directionality. To clear the directionality, the regular reflection means is disposed on opposite side to the light output surface region of the light scattering guide.

In one aspect of the invention, the light scattering guide has a sectional view which satisfies a condition, "a thickness of the volume region along a direction vertical to the light output surface region viewed from the light incident surface region side tends to decrease gradually with increase of a distance from the light incident surface region". This aspect of the invention provides an advantage that the light scattering guiding light source device is constructed in a compact size together with improvement of a uniformity of brightness.

In another aspect of the invention, a light emitting direction correcting means for correcting a emitting directionality characteristic which the light scattering guide possesses is disposed facing the light output surface region of the light scattering guide. The light scattering direction correcting means is formed unitary with or in a separate body with a light scattering guide.

These light scattering guiding light source devices in various aspects are disposed as a backlight source of the liquid crystal display device, there can be proposed a liquid crystal display device which is reflected of various features which is possessed by the light scattering guiding light source device of the aspects as described.

To describe a scattering characteristic of the light scattering guide used in the invention, two concepts, scattering irradiation parameter E and correlation distance "a" can be utilized, those of which are described referring to the Debye theory as follows.

In case where, during the time that a light with an intensity IO transmits through medium by "y" (cm), the intensity is attenuated to I due to then scattering, an effective scattering irradiation parameter E is defined by the equations (1) and (2).

$$E[\text{cm}^{-1}] = -[1n(I/I0)]y \tag{1}$$

$$E[\text{cm}^{-1}] = -(1/I)\, dI/dy \tag{2}$$

The equations (1) and (2) are expressions of respectively so called an integration and a differential forms, and a physical meaning is equivalent. E is sometimes called as a turbidity depending on the situation.

On the other hand, an intensity of the scattering light when the light scattering arises by an ununiformity structure distributed into medium is expressed by the following equation (3) in an ordinary case where most of emitting lights are vertical polarizing lights for the incident light of vertical polarizing light (Vv scattering).

$$Vv = [(4\langle \eta^2 \rangle \pi^3)/\lambda_o^4] \int_O^\infty C\gamma(r)dr \tag{3}$$

where $$C = [r^2 \sin(vsr)]/vsr \tag{4}$$

It is known that, when a natural light is incident, in consideration of Hh scattering, the equation (5) where the right edge of the equation (3) is multiplied by $(1+\cos^2\phi)/2$ may be considered.

$$Ivh = Vv(1+\cos^2\Phi)/2 \tag{5}$$

Where $\lambda_0$ represents a wavelength of an incident light, $v=(2\pi n)/\lambda_o$, $s=2\sin(\phi/2)$. Symbol "n" represents a refractive index of medium, $\phi$ a scattering angle, $\langle\eta^2\rangle$ a dielectric constant fluctuation root-mean-square of the medium (hereinafter, $\langle\eta^2\rangle=\tau$ meets, where $\tau$ is suitably used), and γ(r) a correlation function. The correlation function γ(r) is expressed by the following equation (6).

$$\gamma(r) = \exp(-r/a) \quad (6)$$

According to Debye, when medium structure with an ununiform refractive index is separated into A phase and B phase by a boundary face, the equations (7) and (8) are established for a relationship between a correlation function γ(r) and a correlation distance "a" and a dielectric constant fluctuation root-mean-square γ.

$$a[cm] = (4v/s) - \phi_A \phi_B \quad (7)$$

$$\tau = \phi_A \phi_B (n_A^2 - n_B^2)^2 \quad (8)$$

where V ; all volume
S; all area of boundary face $\phi_A$, $\phi_B$; volume percentage of A phase and B phase $n_A$, $n_B$; refractive indices of A phase and B phase.

Assume that the ununiform structure is formed on spherical boundary face having a radius R, then the correlation distance "a" is expressed in the following equation (9).

$$a[cm] = (4/3)R(1-\phi_A) \quad (9)$$

Using the equation (6) in relation to a correlation function γ(r), an effective scattering irradiation parameter E at the time that the natural light is incident on the medium in accordance with the equation (5) is calculated, thereby the result comes to the following.

$$E = [(32a^3 \tau \pi^4)/\lambda_0^4] f(b) \quad (10)$$

where $$f(b) = [\{(b+2)^2/b^2(b+1)\} - \{2(b+2)/b^3\} 1n(b+1)] \quad (11)$$

$$b = 4v^2 a^2 \quad (12)$$

are satisfied.

In the relationship as described above, it is understood that a correlation distance "a" and a dielectric constant fluctuation root-mean-square τ are varied and this thereby enables to control a scattering light intensity, an angular dependency of the scattering light intensity, and the effective scattering irradiation parameter E.

FIG. 1 shows, in case of E=50 [cm$^{-1}$] and E=100 [cm$^{-1}$], a characteristic curve with horizontal axis of a correlation distance "a" and vertical axis of a dielectric constant fluctuation root-mean-square τ, expressing a condition of making the effective scattering irradiation parameter E constant.

In general, a larger value of E provides a larger scattering power, and a smaller E provides a smaller scattering power, in other words, this designates to approximate a transparence. E=0 represents a state entirely without scattering.

Therefore in general, the light scattering guide having a smaller value of E is employed for constituting a surface light source having a relatively larger area, and the light scattering guide having a larger value of E is employed for constituting a surface light source having a relatively smaller area.

For example, if an effective scattering irradiation parameter E is around 0.001 [cm$^{-1}$], then a light scattering guide with a dimension of several tens m can uniformly be illuminated. In case of around E=100 [cm$^{-1}$] or E=50 [cm$^{-1}$] in FIG. 1, it is suitable to illuminate a light scattering guide having a smaller size (for example, an extent of several mm to several cm).

In consideration of the guideline as described above, an extent of E=0.45 to 100 [cm$^{-1}$] is exemplified as a value range of an effective scattering irradiation parameter E in practical use in the light scattering guide which is employed in the light scattering guiding light source device being ordinarily used. In particular, an example of such value range suitable for the backlight source of the liquid crystal display having a size of 3 to 11 inches, approximately satisfies $1.0 \leq E \leq 15$.

On the other hand, a correlation distance "a" is a quantity which is deeply related to a directionality of the scattering light in the individual scattering phenomena inside the light scattering guide. As is estimated in the forms of the equations (3) and (5), the light scattering in the light scattering guide is generally of a forward scattering property, however the intensity of the forward scattering property varies depending on a correlation distance "a".

In FIG. 2, such is exemplified for two values of "a" by a graphical representation. In the drawing, horizontal axis expresses a scattering angle φ (a forwarding direction of an incident light is made φ=0) and vertical axis expresses an intensity of a scattering light in assuming the natural light, this designates Vvh (φ) / Vvh (0) that is a value where the equation (5) is normalized for φ=0°. As written together in the drawing, in case of a=0.13 μm, conversion into a particle size by the equation (9) 2R=0.2 μm, then a graph of a standardized scattering intensity comes to a relaxed reduction function related to φ, and in case of a =1.3 μm, conversion into a particle size by the equation (9) 2R=2.0 μm, then a graph of a standardized scattering intensity comes to a function where φ is rapidly decreased within a smaller range.

In this way, it can be argued that the scattering produced by an ununiform structure of a refractive index within the light scattering guide shows basically a forward scattering property, which is weakened by a smaller value of the correlation distance "a", and a range of scattering angular range by once of scattering comes to have a tendency to be widened. This fact itself has already been confirmed by an experimentation.

The foregoing is an argument aiming at the scattering phenomenon itself by a refractive index ununiform structure distributed inside the light scattering guide, however in order to evaluate a directional characteristic or the like actually emitted from the light output surface of the light scattering guide, it is required to consider a phenomenon of a total reflection of the light scattering guide together with a transmittance (an escape factor from the light scattering guide) at the time of light emitting.

As is well known as a basical optics theory, a light being incident on the light output surface from the inner-side of the light scattering guide, in case where it exceeds a critical angle ac (here, a direction of a normal erected on the light output surface is made 0°) determined by a refractive index of the medium inside and outside the light scattering guide, then the emitting (escape) to the external (air layer) does not arise. A value ac=42° is produced in a representative material, PMMA (a refractive index 1.492), which is employed in the invention. In case of the other materials, there can be obtained a value having not so large difference therebetween.

As described above, the scattering inside the light scattering guide exhibits a forward scattering property, thus in an ordinary case which takes a light incident surface on lateral-side of the light output surface, it is considered as a rare case that a primary scattering light produced when the light incident from the light incident surface encounters the ununiform structure immediately satisfies the critical angular condition described above.

In other words, it is estimated that, for emission of a light from the light output surface, there largely contributes the phenomenon wherein the multi-scattering inside the light scattering guide or the light which has been traveled through a boundary face of back surface-side of the light scattering guide or through reflection or the like by the reflection member, satisfies the critical angular condition and is emitted to the external.

If such is the case, on looking at the light satisfying the critical angular condition, the forward scattering property which is an attribute of the individual scattering phenomenon is reduced to an appreciable extent, a notable spread must be produced in a traveling direction distribution of the light. Thus, a directionality characteristic of the light emitted from the light scattering guide is greatly varied with an angular dependency of a transmittance (escape factor) in the light output surface of the light satisfying the critical angular condition.

Generally, a boundary face transmittance in case of critically satisfying the critical angular condition is extremely low (for example, in case of acrylic resin-air boundary face, the transmissivity of P polarizing component is around 40%, that of S polarizing component is around 20%), and rapidly rises on lowering of the critical angle, and comes substantially constant under the condition of lowering by equal to or more than 5° to 10° (in case of acrylic resin-air boundary face, the transmissivity of P polarizing component is equal to or more than 90%, that of S polarizing component is equal or more than 85%).

In view of the above, it is estimated that a light with an incident angle of around 35° to the light output surface must contributes the light emission from the light output surface of the light scattering guide. In consideration of a refractive index in the light output surface, the light incident on the light output surface at an incident angle of around 35° forms an angle of about 60° with a normal erected on the light output surface (a refractive index of the light scattering guide is ordinarily equal to about 1.5). That means, an emitted light from the light output surface of the light scattering guide comes to a light having a directionality rising, in roughly estimating, forming around 30° with a front surface of the light output surface.

However, it is noted that too smaller value of a correlation distance "a" considerably reduces the forward scattering property itself, the scattering light containing only primary scattering generates in a direction with a wide range, this results to weaken the directionality. The present invention is to provide a precondition of using a light scattering guide with a limited range of preventing the phenomenon as described above from being notable (hereinafter referred to as "a light scattering guide of an emitting directionality"). In the numerical value of correlation distance "a", such is an extent of 0.01 $\mu$m to 50 $\mu$m, and in particular, may preferably satisfy a >0.05 $\mu$m.

The invention is to use the light scattering guide of such emitting directionality, to arrange a regular reflection means on opposite-side to the light output surface, and depending on requirement such as application to the backlight source of the liquid crystal display device, a light emitting direction correcting means is provided facing the light output surface-side. As for the light scattering guide of such emitting directionality, a thickness viewed from the light incident surface side is varied to produce a more upgraded characteristic.

This specification describes in later paragraphs a function of each means disposed together with these light scattering guides of emitting directionality, the meaning of varying a thickness of the light scattering guide, and material and manufacturing method of the light scattering guide and so forth.

DETAILED DESCRIPTION OF THE PREFERRED EMBODIMENTS

Figure 1:
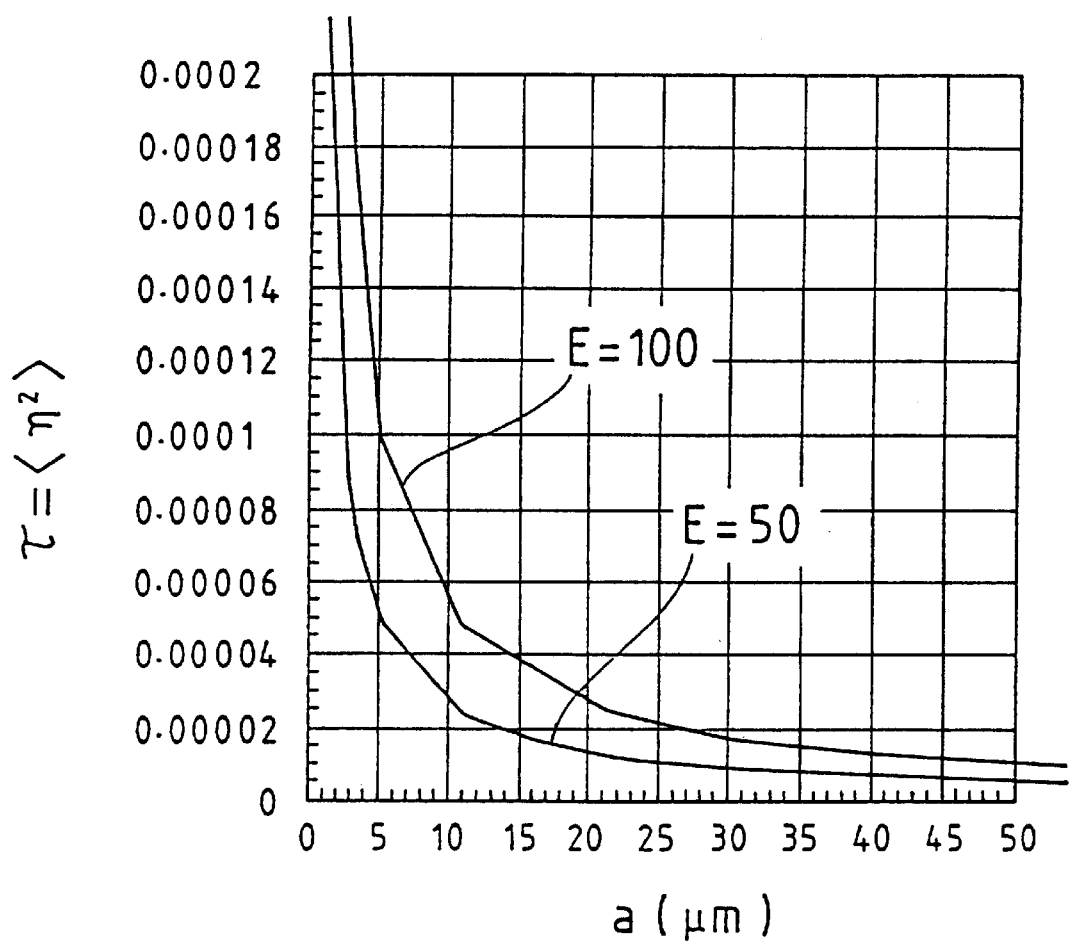
FIG. 1 is a characteristic curve expressing a condition to make an effective scattering irradiation parameter E to be constant with horizontal axis of a correlation distance "a" and vertical axis of a dielectric constant fluctuation root-mean-square t in case of E=50 [cm$^{-1}$] and E=100[cm$^{-1}$]
Figure 2:
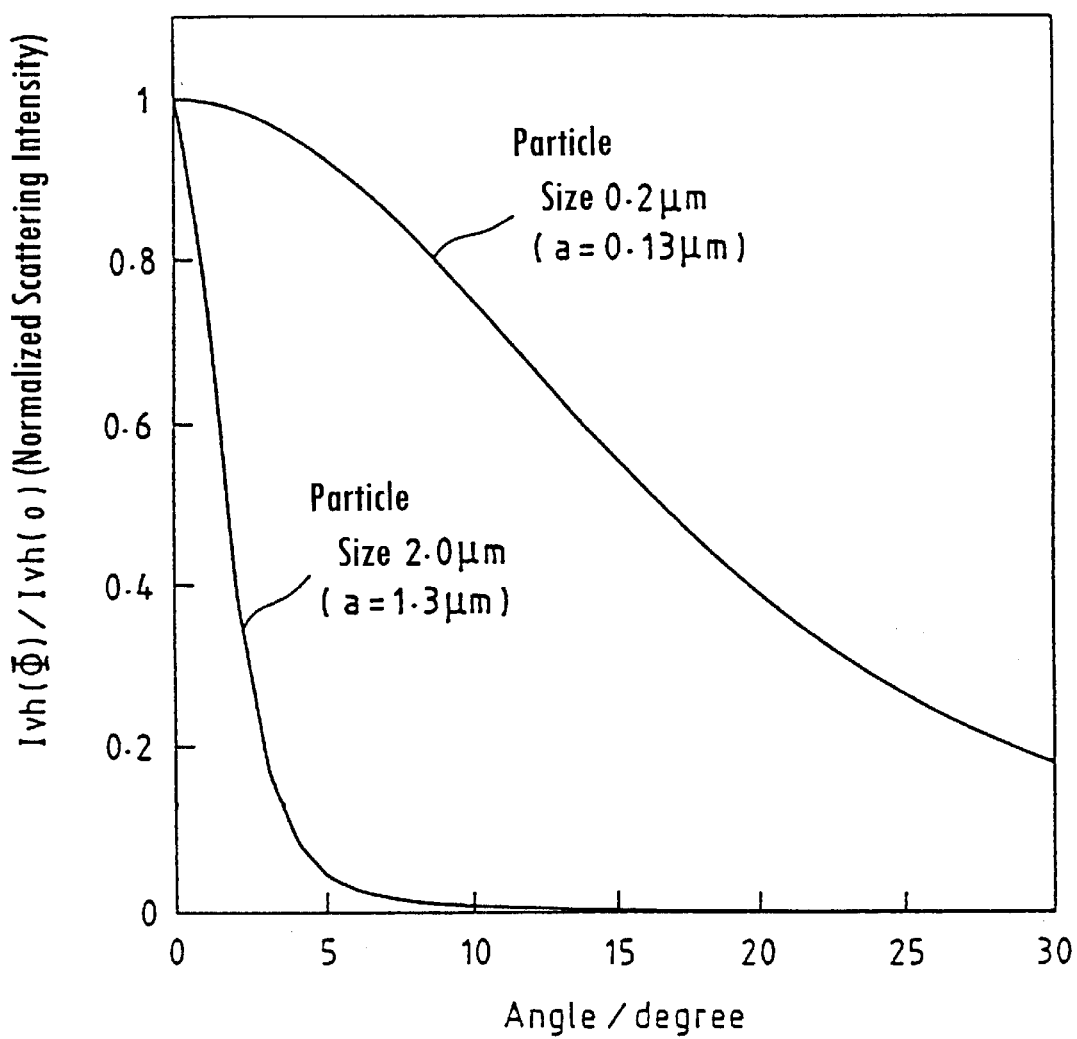
FIG. 2 is a graphical representation showing a variation of an intensity of a forward scattering property of a light scattering guide depending on a correlation distance "a"
Figure 3:
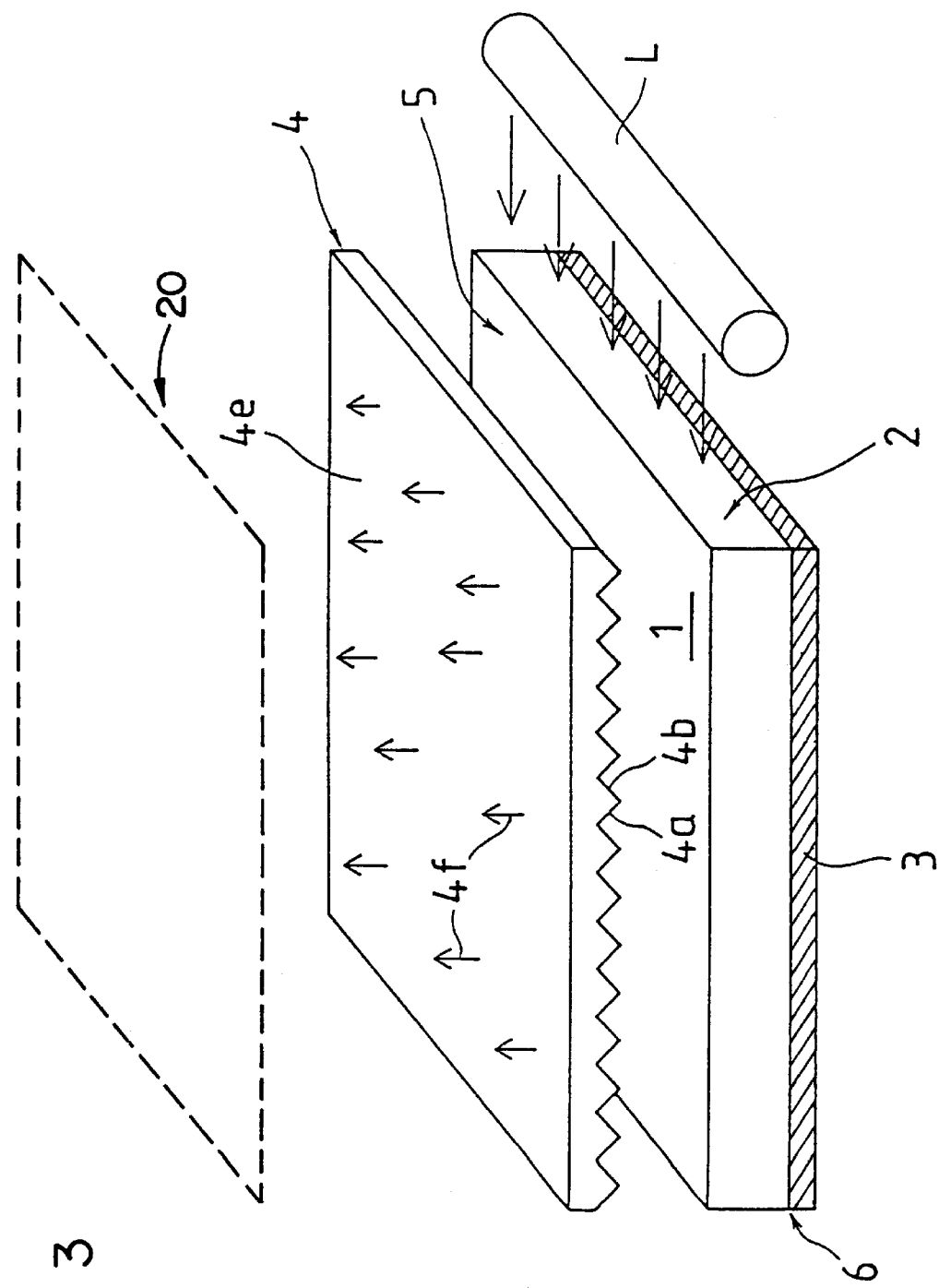
FIG. 3 is a typical view showing a first embodiment of a light scattering guiding light source device according to the invention.

Preferred embodiments of the invention are described in detail referring to the drawings herein attached. In FIG. 3 representing a first embodiment, numeral 1 depicts a light scattering guide of an emitting directionality, on its one lateral surface-side surface is arranged with a light source (fluorescent lamp) L, a light is incident leftward from a light incident surface 2, and a light is taken out from a light output surface 5. An outside of the light output surface 5 is arranged thereon with a light emitting direction correcting element 4 including a line shaped prism surfaces 4a and 4b, and its flat surface 4e is used as a surface light source, a light flux 4f with a directionality is obtained. On upper-side thereof may be further provided with a known liquid crystal display device (polarizer), a liquid crystal cell, and a driving circuit etc., to constitute a liquid crystal display A back surface 6 of the light scattering guide 1 is not provided any particular treatment for producing a strong light scattering such as a light diffusion ink pattern or irregular diffusion surface or the like. However, a region in adjacent to the light source L is made to be a rough surface, to prevent the brightness irregularity due to a strong reflection of the light source L. A silver foil sheet 3 is arranged as a reflection means of a regular reflection opposing to the back surface 6. A reason why one with the regular reflection property is employed as a reflection means arranged opposing to the back surface 6, and not using one having an irregular reflection property (for example, a white sheet), is described as follows.

As hereinbefore described, an emitting directionality of the light scattering guide used in the scattering light guiding light source device according to the invention is a property which is supported by "forward scattering property", "a critical angular condition", and "a boundary face transmittance angular characteristic". Therefore, if the reflection means 3 in the arrangement in FIG. 3 is made one with a diffusing reflection property, then an effect of one having the "forward scattering property" from among those three conditions results in being disarranged, a light incident on the light output surface 5 from inner-side of the light scattering guide 1 produces a widened-directional characteristic, a backward scattering component comes to increase.

As a consequence, a directionality of the light emitted from the light scattering guide 1 is weakened, in addition, a function to transfer the light of the light source L to a great distance is disturbed, thus, a uniformity of brightness as a surface light source is deteriorated. Such deterioration of the emitting directionality of the light scattering guide 1 is to degrade an effectiveness of the light emitting direction correcting element 4 using a refractive operation due to a prism surface which will be described in the following paragraph.

In contrast to this, it is considered that, by employing a reflection means 3 of the regular reflection such as a silver foil etc, then without the disadvantage described, there can be obtained a light scattering guide light-source device having a characteristic capable of effectively using a light in comparison with the case of using a white reflection sheet etc.

Figure 4:
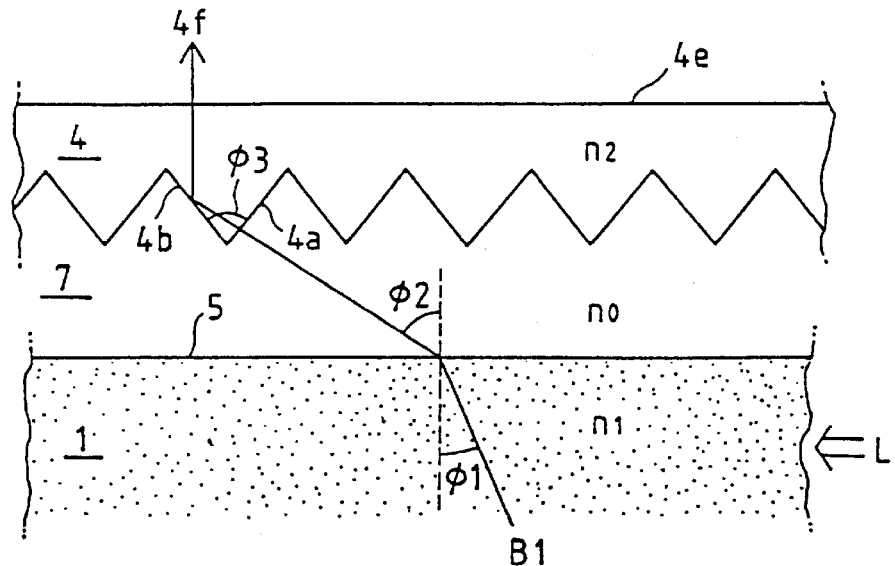
FIG. 4 is an illustrative view for illustrating a behavior of light in case of so arranging a light emitting direction correcting element as to direct its prism surface toward inner-side.
Figure 5:
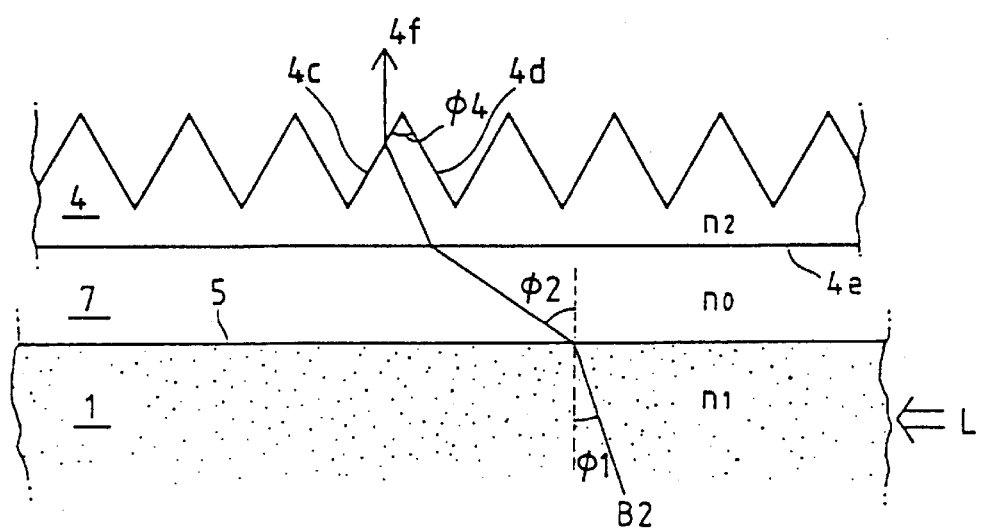
FIG. 5 is an illustrative view for illustrating a behavior of light in case of so arranging a light emitting direction correcting element as to direct its prism surface toward outer-side.

An operation of a light emitting direction correcting element 4 in the arrangement in FIG. 3 is described referring to FIGS. 4 and 5, and thereafter practical measured data for proving the argument in the above are exemplified. In FIGS. 4 and 5, the light scattering guide 1 uses polymethyl methacrylate (PMMA; a refractive index n1=1.492) as a basic material, the light emitting direction correcting element 4 is made of polycarbonate (PC; n2=1.59).

First, FIG. 4 is a sectional view illustrating a behavior of a light in an arrangement in FIG. 3. As shown in the drawing, the light emitting direction correcting element 4 is facing the light output surface 5 side of the light scattering guide 1, and disposed as directing its prism face to inner-side.

A light incident direction is made as arrow mark L direction, then as described, a representative ray B1 satisfying the critical angular condition is incident on the light output surface 5 with an angle of around $\phi 1=35°$, and most of them are emitted to an air layer 7. Then an emitting angle $\phi 2$ is approximately 60° where a refractive index of the light scattering guide 1 meets n1=1.492, a refractive index of the air layer 7 n0=1.

The representative ray B1 travels straight through the air layer 7, and then is incident with an angle approximating vertical to the prism face 4a of the light emitting direction correcting element 4. Particularly, assuming a vertical angle of about $\phi 3=60°$ of the prism face, then the condition as formerly described is highly satisfied (a rate of being incident on the prism face 4b on opposite-side is relatively smaller). Thus, the representative ray B1 travels substantially straight on to the prism face 4b on the opposite-side and is regular-reflected, and further is incident with an angle approximating vertical direction for the flat surface 4e of the light emitting direction correcting element 4, then emitted from the ray emitting direction correcting element 4.

FIG. 5 is a sectional view illustrating a behavior of a light in case of arranging in an outward manner the prism face of the light emitting direction correcting element 4 in the arrangement in FIG. 3.

If an incident direction of the light is in an arrow mark L direction, as in FIG. 4, a representative ray B2 satisfying a critical angular condition is incident on the light output surface 5 with an angle of approximately $\phi 1=35°$ most of them are then emitted to the air layer 7. An emitting angle $\phi 2$ is equal to around 60°

The representative ray B2 travels straight on through the air layer 7, and thereafter is incident in tilt on the flat surface 4e of the light emitting direction correcting element 4, travels along a refractive path as shown in the drawing, and is emitted from face 4c of the light emitting direction correcting element 4 at an angle approximating a vertical direction for the light output surface 5. (A rate of being emitted from a face 4d is relatively smaller.)

A path of the light after being incident on the flat surface 4e of the light emitting direction correcting element 4, varies over a wide range by a refractive index n2 and a prism vertical angle $\phi 4$ each of the light emitting direction correcting element 4, accordingly through selecting these parameters, the light having a directionality to a desirous route can be obtained.

The light emitting direction correcting element 4 is not limited to the prism faces formed in a line shape as in the drawing. However, according to the invention, any of types may preferable be used therefor. For example, there can be considered films where are distributed a group of protrusions in a triangular cone shape or a dome shape, or a plate shaped element which has line shaped convexes each with a semicircular sectional view or the like.

As a particular case, a modification example is employed wherein, to manufacture the light scattering means of such as forming an irregular surface on a metallic die, and the light emitting direction correcting element is allowed to perform its function.

The function of the light emitting direction correcting element has been described as the foregoing. Along with the principle as formerly described, if the rays B1 and B2 in FIGS. 4 and 5 are given of a situation of clearly representing the light emitted from the light scattering guide 1, then an effectiveness of the function of the light emitting direction correction is more raised, there must be obtained a surface light source having a considerably improved brightness viewed from an emitting direction of the representative ray.

Figures 6A, 6B:
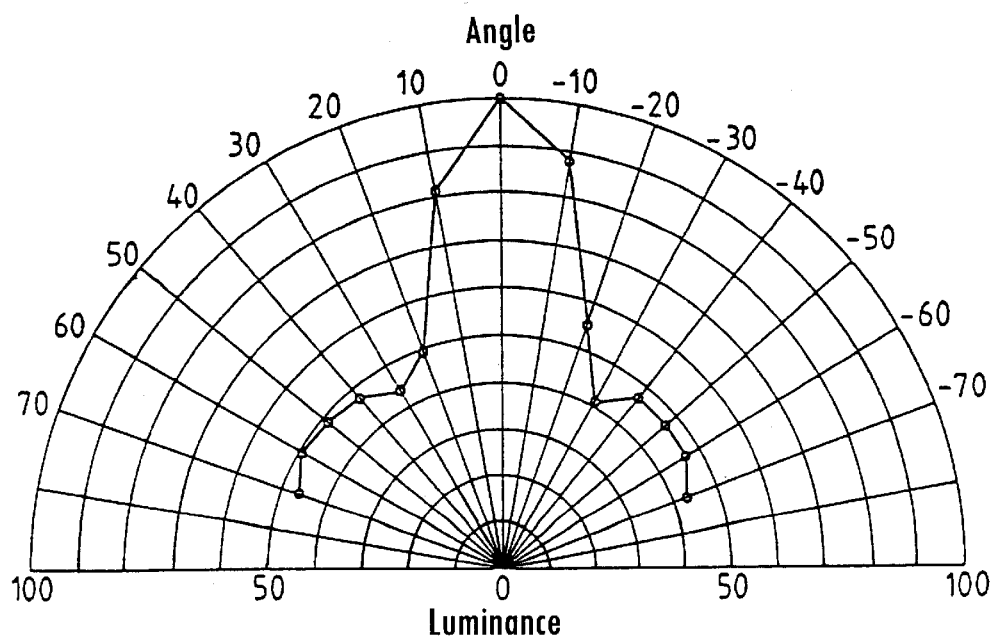
FIG. 6 is table data and a sector graph each expressing practical measured data of an intensity at every angle basis of emitting light in case of using a white sheet having a light diffusing property as a reflector in the arrangement in FIG. 3.
Figures 7A, 7B:
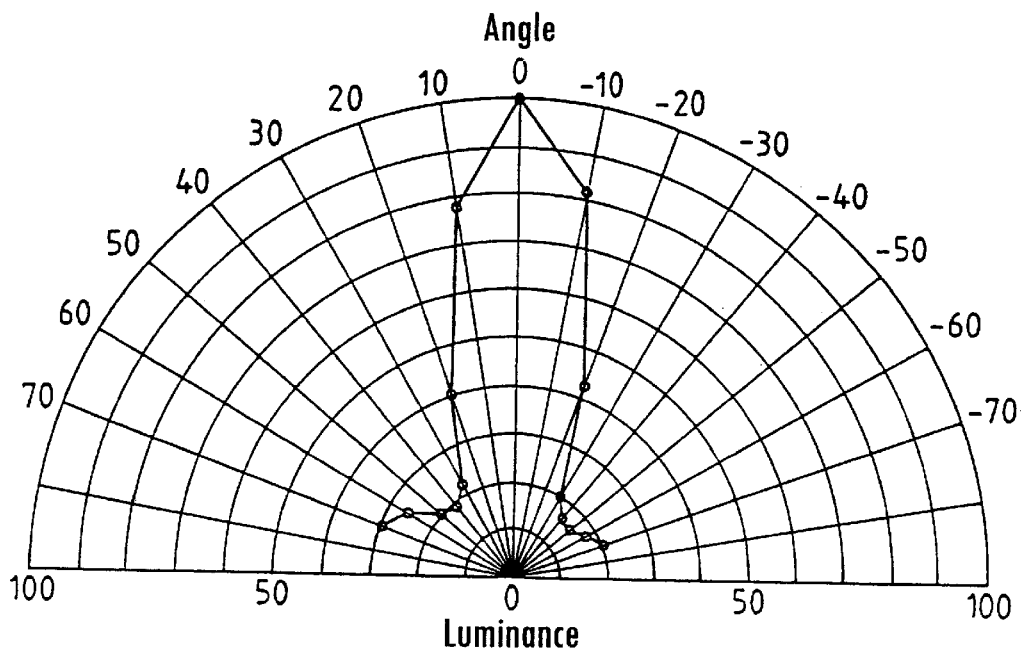
FIG. 7 is table data and a sector graph each showing practical measured data of an intensity at every angle basis of emitting light in case of using silver foil as a reflector in the arrangement in FIG. 3.

FIGS. 6 and 7 are a sector shaped graph and table data that show the practically measured comparison and contrast data for proving realization of such situation as described by an arrangement of the light reflection means 3 of a regular reflection property on back surface-side of the light scattering guide 1.

In FIG. 6, as a reflector 3 in the arrangement in FIG. 3, practically measured data of light intensities at every angle basis of an emitting light 4f in case where a white sheet having a light diffusing property of a high reflectivity conventionally used for such kind application is used, are shown with a front direction 0° of the emitting surface 4e, a forward direction 90° viewed from the light source L, and a backward direction −90°. Numerals in Table are absolute values expressed by using nit as a unit, and a result (relative value) that the emitting light intensity in the front direction (0° direction) is normalized to 100. The sector graph is produced by plotting this relative value.

As a light scattering guide 1, is used 4 inches×4 inches flat plate shaped one in which silicone series fine particles are uniformly dispersed into PMMA at a rate of 0.05 wt %. A vertical angle $\phi 3$ (see FIG. 4) of the prism face 4a and 4b of the light emitting direction correcting element 4 made of PC is made 64°.

On the other hand in FIG. 7, as a reflector 3 in the arrangement in FIG. 3 according to the invention, practically measured data of light intensities at every angle basis of the emitting light 4f in case where a silver foil sheet having a high reflectivity with a regular reflection property is used, are measured and expressed with the entire same condition as in FIG. 6.

In comparison of both drawings, the fact as follows can clearly be understood.

(1) In either of FIGS. 6 or 7, a directional characteristic of the light is of a symmetrical form with a peak value at 0° direction. This is because a directionality of the light emitted from the light scattering guide 1 having an emitting directionality property is corrected to the front direction by operation of the light emitting direction correcting element 4 (see FIG. 4 and its related description).

(2) In either of sector graphs in FIGS. 6 or 7, swells of corresponding intensities are present in a direction shifted equal to or more than ±30° from the front direction.

(3) However in FIG. 7, such swell is far smaller than in FIG. 6, and the absolute value shown in table data is appreciably smaller. For example, in comparison of data in ±60° direction, a case in FIG. 6 shows 1104 nit, 1042 nit, and a case in FIG. 7 shows 710 nit, 513 nit.

Furthermore in data in ±70° direction, a case in FIG. 6 shows 1030 nit, 970 nit, but a case in FIG. 7 shows 798 nit, 559 nit.

(4) In contrast to this, for an absolute value in 0° direction, numerical values are 2231 nit for FIG. 6, while 2717 nit for FIG. 7.

From the forgoing, the data in FIGS. 6 and 7 prove the argument as immediately previously described in that, as a reflector 3 arranged on back surface-side of the light scattering guide 1 in the arrangement in FIG. 3, the use of one having the regular reflection property is far more advantageous than using one having a light diffusive property. Thus, using the reflector of the regular reflection property, the light, which is dispersed to lateral-side of the light scattering guide light-source device and comes useless, is largely reduced, hence, there can be obtained a light flux with a high utility having a directionality with suitable spread centered the front direction. It is needless to say that such characteristic is extremely preferable as a backlight source of the liquid crystal display device.

Figure 8:
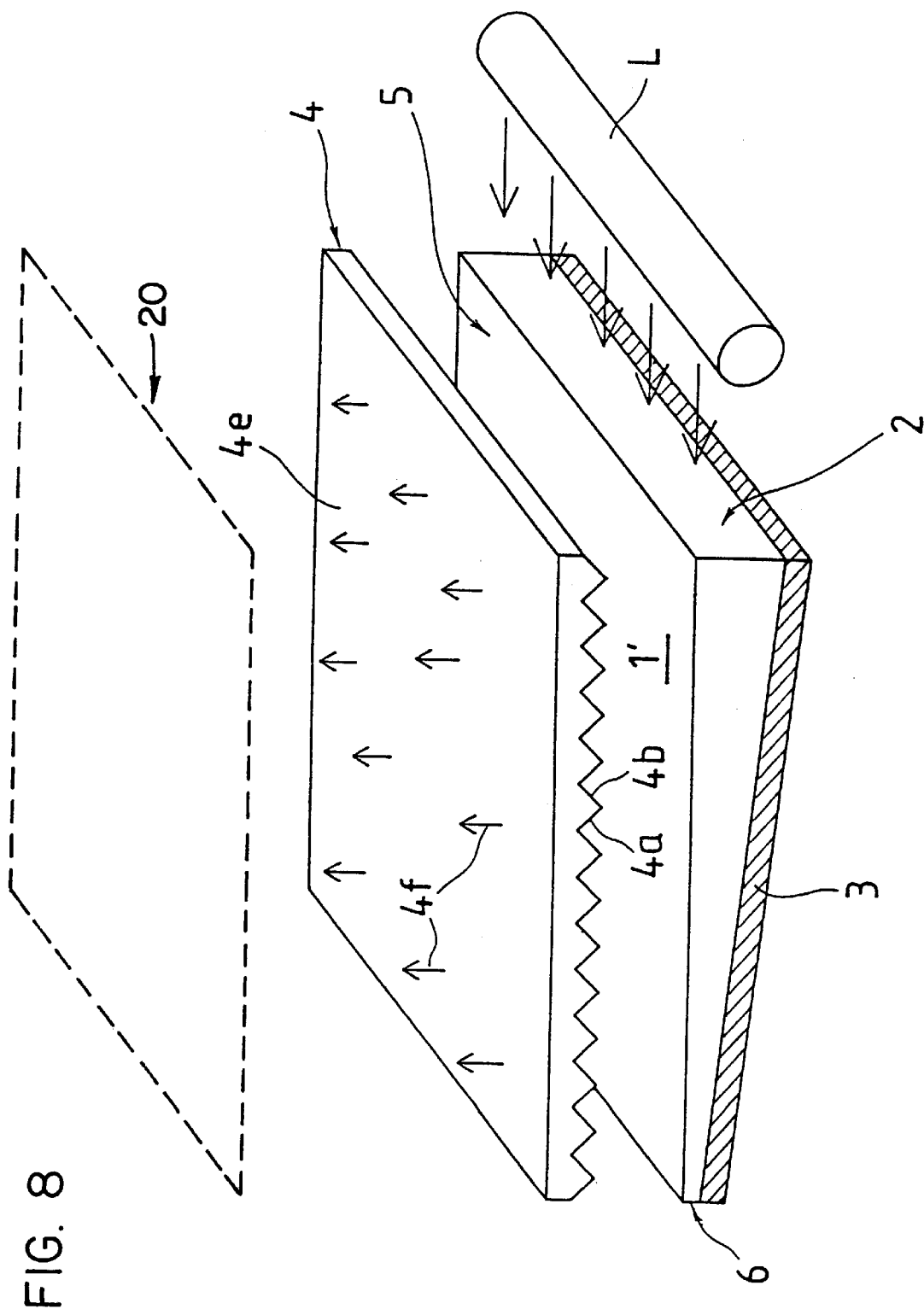
FIG. 8 is a typical view showing a second embodiment of a light scattering guiding light source device according to the invention.

Followingly, a second embodiment according to the invention is described referring to FIG. 8. In FIG. 8, the elements and parts common to the first embodiment (FIG. 3) are designated by the same symbols and numerals. In the drawing, 1' depicts a light scattering guide with an emitting directionality having a wedge shape, on one lateral-side surface is disposed a light source (fluorescent lamp) L. A light output surface 5 side of the light scattering guide 1' is arranged with a light emitting direction correcting element 4 having line shaped prism surfaces 4a and 4b, its flat surface 4e is used as a surface light source to produce a light flux "f" with a directionality. An upper-side thereof may be further provided with a known liquid crystal display liquid crystal display panel 20 to constitu.

The light scattering guide 1' is not provided on its back surface 6 with any particular treatment for producing the intensive light scattering such as a light diffusion ink pattern or irregularity diffusing surface or the like. However, it is considered that the vicinity region of the light source L is made a rough surface, and a brightness irregularity due to a strong reflection of the light source L is prevented. A silver foil sheet 3 is disposed as a reflection means of a regular reflection property opposing to a back surface 6.

The construction as described above does not differ from the construction in the first embodiment shown in FIG. 3, with exception that the light scattering guide 1' is of a wedge shape, and a thickness viewed from the light incident surface region-side tends to decrease with the increase of a distance from the light incident surface side. Therefore, in the construction of the second embodiment shown in FIG. 8 there can similarly be established the arguments as formerly described; namely, relating to the directionality of the light scattering guide 1'; the operation of the light emitting direction correcting element 4; and a advantage obtained by using one having a regular reflection property for the reflector 3.

A repeated reflection effect on tilted surface as described later provides an advantage to considerably improves a level of the brightness as a surface light source, and to easily secure a uniformity of the brightness.

Figure 9:
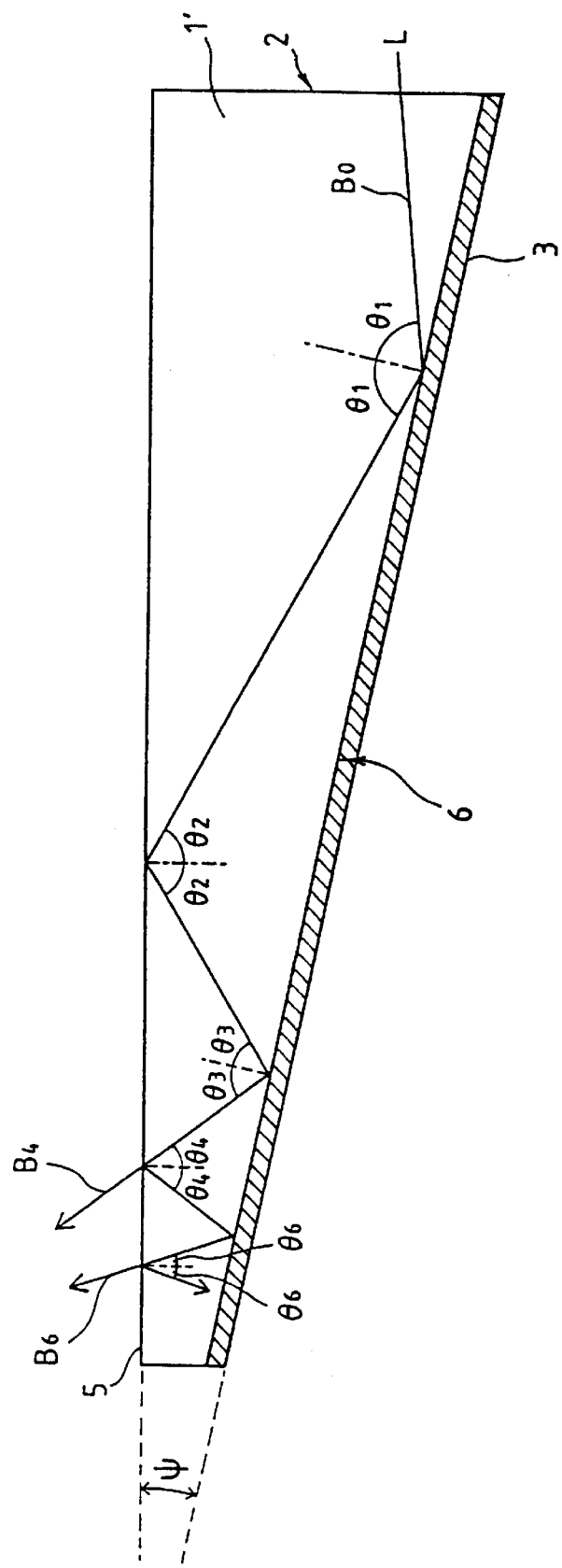
FIG. 9 is a sectional view of a light scattering guide and a reflector each of a wedge shape used in the arrangement in FIG. 8, where a pattern of repeating reflection inside a light scattering guide is exemplified in respect of a representative ray.

FIG. 9 is a sectional view of the wedge shaped light scattering guide 1' and reflector 3 used in the arrangement in FIG. 8, exemplifying a situation of repeated reflection within the light scattering guide 1'. Now assume to represent, by a ray B0, a light inputting into a light scattering guide 1 from a light incident surface 2, then B0 is considered as forming a small angle with a horizontal direction as shown in the drawing.

Observing a behavior of the ray B0, while receiving a directional conversion by scattering at a constant rate, the ray B0 repeats reflections in a light output surface 5 and the tilted surface 6 as shown in the drawing, and approximates a thin thickness portion of the light scattering guide 1'. The reflections in the surfaces 5 and 6 and the surface of the silver foil 3 all are also regular reflections, thus, an incident angle and a reflecting angle in individual reflection are equal to each other ($\theta 1$, $\theta 2$, $\theta 3$, . . . ), where, in attention to reflection in the light output surface 5, it is found that a relationship of $\theta 2 > \theta 4 > \theta 6$ . . . are established.

In consideration of a boundary face transmittance on each reflection, by the same argument as is the case of the emitting directionality property of the light scattering guide, a total reflection arises under the condition of $\theta i > ac$ (a critical angle; 42° at PMMA-air boundary face), a transmittance rapidly rises on lowering of θi less than αc, and a transmittance comes substantially constant on θi equal to or less than a predetermined value (around 35° at PMMA-air boundary face). In the drawing, a situation of producing the emitting lights B4 and B6 is shown by a relationship of θ2>αc>θ4>θ6.

Such effect is not limited to the representative ray B0 (non-scattering light), and the effect must similarly be produced as to a primary scattering light or a multi-scattering light, hence, as a whole of light scattering guide 1', it is considered to produce an effect that a light emitting rate from the light output surface 5 is raised with the increase of a distance from the light incident surface 2. In evaluating this effect by a function f(x) of a distance "x" from the light incident surface 2, f(x) is an increase function relating to "x". On the other hand, in the vicinity of the light incident surface 2, an effect of approximating the light source 5 exerts on both of a direct light and a scattering light. This proximity effect is evaluated by g(x), then g(x) comes to a reduction function.

The proximity effect g(x) is canceled by f(x), a tendency arises wherein a light is allowed to emit from the light output surface 5 after the light is introduced to a longer distance. An opportunity, in which the light within the light scattering guide 1' is incident on the light output surface 5, is considered to increase as a whole by effect of the wedge shape, it can therefore be expected in effect that a brightness level itself is remarkably improved as a surface light source.

By varying an angle ψ formed between both surfaces 5 and 6, it is estimated that some variations arise in a brightness level, a uniformity, and a directionality and the like. In addition, by making a tilted surface 6 (also the light output surface 5 according to the circumstances) to be a curvature surface, the increased transition of the reflection angles θ1, θ2, θ3, . . . is controlled thereby to realize a more preferable characteristic.

An effect by employing the wedge shaped light scattering guide 1' is established under the precondition that the reflector 3 is of a regular reflection property, and if this is a white sheet having a diffusive reflection property, a traveling direction of the light is diffused in wide range at back surface side of the light scattering guide 1', the light is difficult to be transferred to a long distance, simultaneously this gives an adverse effect to an emitting directionality of the light scattering guide 1'.

Figures 10A, 10B:
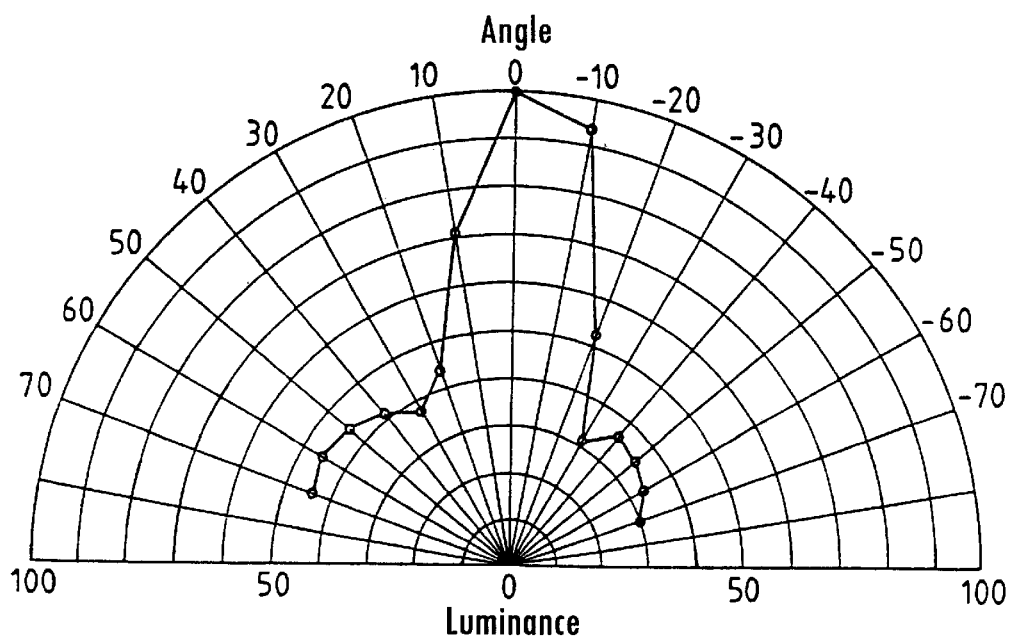
FIG. 10 is table data and a sector graph each showing practical measured data of an intensity at every angle basis of emitting light in case of using a white sheet having a light diffusing property as a reflector in the arrangement in FIG. 8.
Figures 11A, 11B:
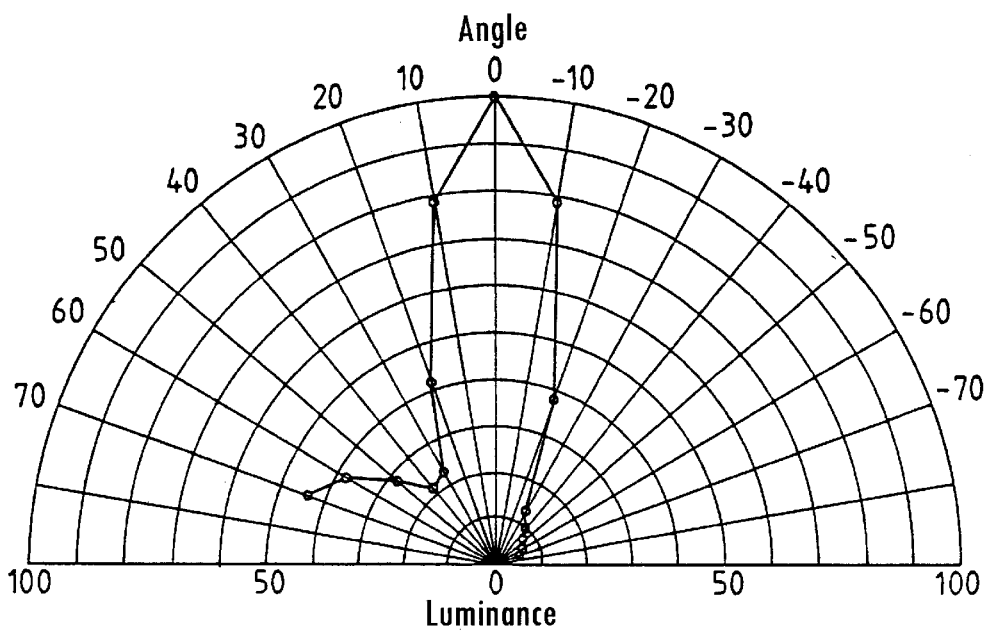
FIG. 11 is table data and a sector graph each showing practical measured data of an intensity at every angle basis of emitting light in case of using a silver foil sheet having a regular reflection property as a reflector in the arrangement in FIG. 8.

FIGS. 10 and 11 show practically measured data that prove the foregoing, where a result of execution of the measurement under the same condition as in FIGS. 6 and 7 is shown, in exception of replacing a flat plate shape with a wedge shape for the light scattering guide.

In FIG. 10, as a reflector 3 in the arrangement in FIG. 8, practically measured data of light intensities at every angle basis of an emitting light 4f in case where a white sheet having a light diffusing property with a high reflectivity conventionally used for such kind application is used, are shown with a front direction 0° of the emitting surface 4e, a forward direction 90° viewed from the light source L, and a backward direction −90°. Numerals in Table expresses absolute values expressed by using nit as a unit, and a relative value that the emitting light intensity in the front direction (0° direction) is normalized to 100. The sector graph is produced by plotting this relative value.

As a light scattering guide 1, is employed 4 inches×4 inches flat plate shaped one in which silicone series fine particles are uniformly dispersed into PMMA at a rate of 0.05 wt %. A vertical angle φ3 (see FIG. 4) of the prism face 4a and 4b of the light emitting direction correcting element 4 made of PC is allowed to be equal to 64°.

On the other hand in FIG. 11, as a reflector 3 in the arrangement in FIG. 8 according to the invention, practically measured data of light intensities at every angle basis of the emitting light 4f in case where a silver foil sheet having a high reflectivity with a regular reflection property is used, are measured and expressed. In comparison of FIGS. 6, 7, 10, and 11 together with each other, the fact as follows can clearly be read.

(1) In either of FIG. 10 or 11, a directional characteristic with a peak value at 0° direction is realized as is the case of FIGS. 6 and 7. This is because a directionality of the light emitted from the light scattering guide 1' having an emitting directionality is corrected to the front direction by operation of the light emitting direction correcting element 4.

(2) In a sector graph in FIG. 10. swells of larger relative intensities are present in a direction shifted equal to or more than ±30° from the front direction. In a sector graph in FIG. 11, a smaller swell is present only in a forward direction.

(3) The absolute value corresponding to such swell portion is smaller as a whole. Particularly, numerical values of −40 to 70° expressing backward scattering exceeding 40°, are sequentially 1562 nit, 1514 nit, 1441 nit, and 1277 nit in a case (white sheet) in FIG. 10. In contrast to this, a case (silver foil) of FIG. 11 is as extremely small as 512 nit, 362 nit, 304 nit, and 221 nit.

(4) An absolute value in O direction (front direction) is 2231 nit for FIG. 6, 2717 nit for FIG. 7. 4234 for FIG. 10, and 5163 for FIG. 11, it is therefore found that a rapid improvement has been achieved.

From these facts, although a brightness of the light scattering guide light-source device is largely improved by employing a wedge shape for the light scattering guide 1', it is however found that its effect is remarkably enhanced by employing one having a regular reflection property in the reflector 3 arranged on back surface-side.

In the both embodiments, a silver foil is used as a reflector 3. However according to the invention, any of materials having a regular reflection property may preferably be used. For example, a sheet vapor-deposited thereon with aluminum film may preferably be employed, or the silver foil or aluminum foil may preferably be adhered on back surface 6 of the light scattering guide, using a adhesive agent which is transparent or which does not disturb a regular reflection function on the reflecting surface. In addition, on manufacturing the light scattering guide (see a method of manufacturing described as follows), a in-mold molding method using a hot melt type adhesive agent which is transparent or which does not disturb a regular reflection function of the reflecting surface, can be utilized for fixing on the back surface.

In this way, in case where a reflector made of silver foil or aluminum foil or the like is made into a unit with the light scattering guide by a means such as adhesion or the like, an air layer does not enter between the light scattering guide and the reflector, this introduces an advantage listed as follows.

(1) By operation ultra-violet ray included in a light of the fluorescent lamp or the like, an oxidation phenomenon on surface of the reflector proceeds to lower a light reflectivity, simultaneously a phenomenon where the regular reflection property is lost is prevented. This prevents year aged deterioration (variation) of the brightness of the surface light source device or the liquid crystal display device with incorporation thereof. A protecting film, with less absorption property for ultraviolet ray, for preventing oxidation is formed on surface of ordinary silver foil or aluminum foil, this however is not enough for the long range usage, in addition, a problem arises in deteriorating a light transmittance of a visual light region when enhancing the protection by increasing a thickness of the protecting film having the absorption property of the ultraviolet ray. To ensure the prevention of oxidization, the adhesive agent containing the ultraviolet ray absorption agent may preferably be used.

(2) There can be prevented from generation of brightness irregularity with coloring phenomenon or stripe shape due to optical interference phenomenon which is produced by presence of the thin air layer having a refractive index different from the light scattering guide. Especially, if the adhesive agent to be used having a refractive index approximating, as much as possible, to that of the light scattering guide is selected, such effect comes more secure.

(3) A larger size is selected for the silver foil or the like to be used in the reflector, and the adhesion is so performed as to cover a lateral-side of the light scattering guide other then the light incident surface, then a reflection tape member in separated body comes unnecessary with reduction of the number of parts and components of the whole device, the manufacturing process thereof is advantageously simplified.

(4) The other advantages are to secure a flatness of the surface of the reflector (wrinkling is prevented), and to eliminate a necessity to individually fix the light scattering guide and the reflectors to a housing member.

Figure 12A:
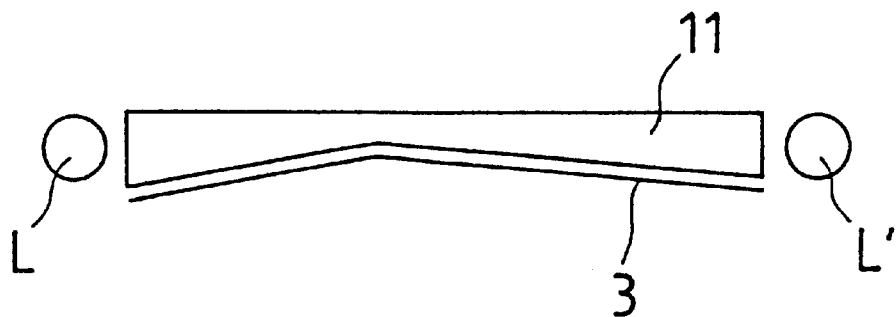
FIG. 12 exemplifies a possible modified example with respect to a shape and arrangement of a light scattering guide and a light source (light supply means).
Figure 12B:
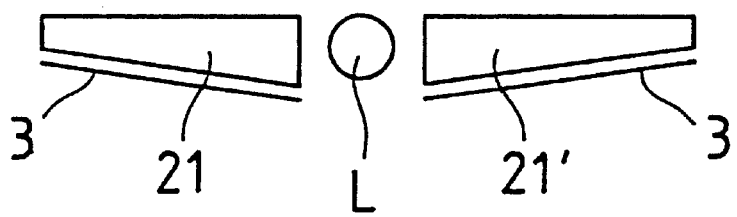
Figure 12C:
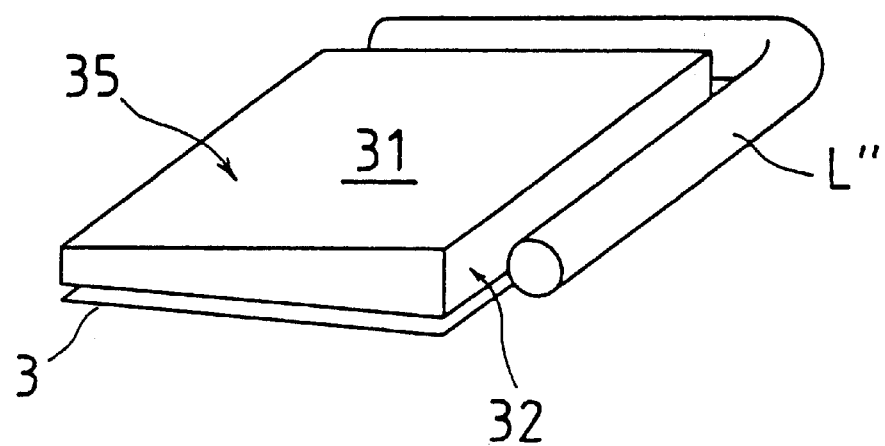

The configuration of the light scattering guide and the light source (light supply means) shown in FIGS. 3 and 8 are the basical pattern and solely for illustration, hence various changes and modifications are made therein without departing from the technical scope of the invention provided that such changes and modifications are to be set forth in the subject matter recited in the claims hereto appended. FIG. 12 exemplifies an available arrangement of the modification. For example, FIG. 12(1) shows an arrangement wherein two wedge shaped ones are confronted with each other for the light scattering guide 11, the silver foil 3 is provided along back surface side, and light sources L and L' are disposed on both-sides. FIG. 12(2) shows an example where one light source L is used simultaneously for light supply of two wedge shaped light scattering guides 21 and 21'.

In FIG. 12(3), using a bent shaped fluorescent lamp, a light is incident from two light incident surface 32 (only one thereof is shown) of the light scattering guide 31 whose thickness is varied two dimensionally. In these modification examples, it is needless to say that the light emitting direction correcting element can be used (not shown). Moreover, there can be employed a modification of the light source element arranged in a concaved portion or a hollowed portion each provided in the light scattering guide.

Finally, materials and a manufacturing method for the light scattering guide used in the invention are described.

The light scattering guide used in the invention has a possibility to use various kinds materials based on polymer materials. Such representative ones include, as shown in Tables 1 and 2, PMMA (polymethyl methacrylate), PSt (polystyrene), and PC (polyearbonate).

TABLE 1

| category | name of polymer | refractive index |
|---|---|---|
| MA | 1. PMMA [polymethyl methacrylate] | 1.49 |
|  | 2. PEMA [polyethyl methacrylate] | 1.483 |
|  | 3. Poly(nPMA) [poly-n-propyl methacrylate] | 1.484 |
|  | 4. Poly(nBMA) [poly-n-butyl methacrylate] | 1.483 |
|  | 5. Poly(nHMA) [poly-n-hexyl methacrylate] | 1.481 |
|  | 6. Poly(iPMA) [polyisopropyl methacrylate] | 1.473 |
|  | 7. Poly(iBMA) [polyisobutyl methacrylate] | 1.477 |
|  | 8. Poly(tBMA) [poly-t-butyl methacrylate] | 1.463 |
|  | 9. PCHMA [polycyclohexyl methacrylate] | 1.507 |
| XMA | 10. PBzMA [polybenzyl methacrylate] | 1.568 |
|  | 11. PPhMA [polypheny1 methacrylate] | 1.57 |
|  | 12. Poly(1-PhEMA) [poly-1-phenylethyl methacrylate] | 1.543 |
|  | 13. Poly(2-PhEMA) [poly-2-phenylethyl methacrylate] | 1.559 |
|  | 14. PFFMA [polyfurfuryl methacrylate] | 1.538 |
| A | 15. PMA [polymethyl acrylate] | 1.4725 |
|  | 16. PEA [polyethyl acrylate] | 1.4685 |
|  | 17. Poly(nBA) [poly-n-butyl acrylate] | 1.4535 |
| XA | 18. PBzMA [polybenzyl acrylate] | 1.5584 |
|  | 19. Poly(2-CIEA) [poly-2-chloroethyl acrylate] | 1.52 |

TABLE 2

| category | name of polymer | refractive index |
|---|---|---|
| AC | 20. PVAc [polyvinyl acetate] | 1.47 |
| XA | 21. PVB [polyvinyl benzoate] | 1.578 |
|  | 22. PVAc [polyvinyl phenyl acetate] | 1.567 |
|  | 23. PVClAc [polyvinyl chloroacetate] | 1.512 |
| N | 24. PAN [polyacrylonitrile] | 1.52 |
|  | 25. Poly(aMAN) [poly-a-methyl acrylonitrile] | 1.52 |
| a-A | 26. PMA(2C1) [polymethyl-a-chloroacrylate] | 1.5172 |
| St | 27. Poly(o-ClSt) [poly-o-chlorostyrene] | 1.6098 |
|  | 28. Poly(p-FSt) [poly-p-fluorostyrene] | 1.566 |
|  | 29. Poly(o, p-FSt) [poly-o-, p-diflurostyrene] | 1.475 |
|  | 30. Poly(p-iPSt) [poly-p-isopropyl styrene] | 1.554 |
|  | 31. PSt [polystyrene] | 1.59 |
| C | 32. PC [polycarbonate] | 1.59 |

A light scattering guide using such polymer material as a base can be manufactured by a manufacturing method as hereinafter described.

First, one thereof is a method of utilizing a molding process containing a kneading process of two or more kinds of polymers.

In detail, two or more kinds of polymers having different refractive indices each other (Optional shapes are available. Industrially, a pellet shape is considered as an example.) are mixed and heated, and kneaded (kneading process), thus kneaded liquid phased material is injected, by a high pressure, into a metallic die of a injection molding machine, and cooled and solidified, to take out the molded light scattering guide from the metallic die, and to produce a light scattering guide having a shape corresponding to the metallic die shape.

The kneaded two or more kinds of different refractive index polymers are solidified without complete mixture situation, thus, an ununiformity (fluctuation) is produced in local concentration thereof to provide fixing, and a uniform scattering power is given.

The kneaded material is injected into a cylinder of the protrusion molding machine, and by protruding using an ordinary procedure, a molded product to be a target can be obtained.

An extremely widened selection is available for a mixture rate or a combining rate of the polymer blend, and such selection may preferably be determined in consideration of a difference of the refractive index, a strength or nature of the refractive index ununiformity structure (the scattering irradiation parameter E, correlation distance "a", and dielectric fluctuation root-mean-square τ and the like) produced by the molding process. The typical available polymer materials are shown in Tables 1 and 2.

Another method of manufacturing materials constituting the light scattering guide is to uniformly mix and disperse the particle shaped materials having different refractive indices (a difference of the refractive index equal to or more than 0.001) into the polymer material.

One method available for uniformly mixing the particle shaped material includes a suspension polymerization method, where the particle shaped material is mixed into polymer, a polymerization reaction is allowed to proceed in a status being suspended in hot water, polymer material mixed uniformly with the particle shaped material can be obtained. This is used as an original material to mold, then a desirous shaped light scattering guide is manufactured.

The suspension polymerization is executed as to a combination of various particle shaped materials and the monomer (combination of particle concentration, particle size, and refractive index and the like), and a plurality of kinds of materials are prepared, those are selectively blended and molded thereby to manufacture a light scattering guides of various characteristics. If the polymer which does not contain the particle shaped material is blended, a concentration of the particles is readily controlled.

Another method available for uniformly mixing the particle shaped material is to knead the polymer material with the particle shaped material. Also in this case, kneading and molding (pelletization) are executed for a combination of various particle shaped materials and the monomer (combination of particle concentration, particle size, and refractive index and the like), those are selectively blended and molded thereby to manufacture a light scattering guide, thereby a light scattering guides of various characteristics is obtained.

A combination of the polymer blend method and the practical shaped material mixing method may be preferable. For example, it is considered to blend polymers having different refractive indices, or to mix the particle shaped material on kneading.

Several examples of methods of manufacturing are described as follows.

Manufacturing Example 1

The 0.3 wt % of silicon series resin powders (Toshiba Silicone Co., Ltd.; TOSPEARL 108) having a particle size of 0.8 μm is added to methacryl resin pellet (Asahi Chemical Industry Co., Ltd.; DELVET 80N), the resultant is mixed and dispersed by a mixer, thereafter protruded in strand shape by a protrusion machine, pelletized by a pelletizer, thus a pellet where the silicon series resin powders are uniformly dispersed is prepared.

This pellet is molded under the condition of a cylinder temperature of 230° C. to 260° C. and a die temperature of 50° C., then a plate shaped light scattering guide with a height 56 mm, a width 75 mm, and a thickness 4.5 mm is obtained.

Thus manufactured light scattering guide has a correlation distance a =0.53 μm, and an estimated calculated value of an effective scattering irradiation parameter E by the equation (11) has satisfied E =12.6 [cm$^{-1}$].

Manufacturing Example 2

The 0.3 wt % of silicone series resin powders with a particle size 0.8 μm (Toshiba Silicone Co., Ltd.; TOSPEARL 108) is added to MMA, and by the known suspension polymerization method, spherical shaped particles where the powders are uniformly dispersed have been obtained. The resultant is pelletized by the pelletizer as is the case of the manufacturing example 1, thereby a pellet in which the silicone series resin powders are uniformly dispersed have been produced.

Hereinafter, the same type of plate shaped light scattering guide can be obtained under the same condition as in the manufacturing example 1. This light scattering guide is entirely difficult to be distinguished in external view with the light scattering guide produced in the manufacturing example 1, where a correlation distance satisfies a =0.53 μm, an estimated value of the effective scattering irradiation parameter E by the equation (11) satisfies E=12.6 [cm$^{-1}$].

Manufacturing Example 3

The 0.5 wt % of polystyrene (PSt) is added to polymethyl methacrylate (PMMA), the resultant is mixed in 10 minutes using a V type tumbler, and then mixed in 5 minutes using henshell mixer. Further the resultant is melted and mixed by a two axis protrusion machine with a diameter 30 mm (Nakatani Machine Co., Ltd.) under the condition of a cylinder temperature 220° C. to 250° C., a screw rotative speed 75 rpm, and a discharging rate 6 kg/hr, thereby a pellet is produced.

This pellet is molded by an injection molding machine under the condition of a cylinder temperature 220° C. to 250° C., a die temperature 65° C., an injection speed of an intermediate speed, and a injection pressure of short shot pressure plus 10 kg/cm$^2$, then a plate shaped light scattering guide with a height and a width 35 mm and a thickness 4.5 mm is obtained.

Manufacturing Example 4

Each 0.05 wt %, 0.08 wt %, 0.10 wt % and 0.15 wt % of silicon series resin powders (Toshiba Silicone Co., Ltd.: TOSPEARL 108) with a particle size 2 μm is added and uniformly dispersed into MMA (methylmethacrylate), and consequently four kinds of test materials and particle non-additive MMA test material are prepared, thus a total of five kinds of test materials each are added 0.5 wt % of benzylperoxide (BPO) as a radical polymerization start agent and 0.2 wt % of n-laurylmercaptan (n-LM) as a chain transfer agent, and are casting-polymerized in 24 hours at 70° C., thereby obtaining every one-sheet of wedge type light scattering guide having a height 68 mm, a width 85 mm, and a thickness of gradually varying from 3.8 mm to 0.2 mm ranging a longer edge direction.

Manufacturing Example 5

The 0.025 wt % of silicone oil is added and uniformly dispersed into MMA (methylmethacrylate), the resultant is further added with 0.5 wt % of benzylperoxide (BPO) as a radical polymerization agent and 0.2 wt % of n-butylmercaptan (n-MN) as a chain transfer agent respectively, and is processed of conversion into sol in 30 minutes at 70° C, further casting-polymerized in 24 hours at 65° C., as a consequence, there can be obtained a wedge shaped light scattering guide with a height 68 mm, a width 85 mm, and a thickness of varying from 3.8 mm to 0.2 mm gradually ranging a longer edge direction.

Manufacturing Example 6

The 0.08 wt % of silicon series resin powders (Toshiba Silicone Co., Ltd.; TOSPEARL 108) with a particle size 2 $\mu$m is added to PMMA (polymethyl methacrylate), and mixed in 10 minutes using the V type tumbler, and followingly mixed in 5 minutes using the henshell mixer. Thus produced is melted and mixed (cylinder temperature 220°C. to 250° C.) and protruded and molded by a two axis protrusion machine, thereby a pellet is produced.

This pellet is injection-molded under the condition of a cylinder temperature 220° C. to 250°C. using the injection molding machine, hence, a wedge type of light scattering guide with a height 68 mm, a width 85 mm, and a thickness of varying from 3.8 mm up to 0.2 mm gradually ranging a longer edge direction is produced.

Industrial Applicability

As hereinbefore fully described, the present invention is to realize a bright surface (shaped) light source with a sufficient directionality with a suppression for the light emission to an unnecessary direction by arranging a reflection means of a regular reflection property on back surface-side of the light output surface of the light scattering guide having an emitting directionality.

In particular, a thickness of the light scattering guide is given of variance, a light emitting direction correcting means is arranged facing the light output surface, consequently, the functions of these means are enhanced in multiplying effect, there can thus be produced a light scattering guiding light source device having a superior characteristic which has not conventionally been estimated.

The light scattering guide light-source device exhibiting such feature is disposed on back surface side of the liquid crystal display element as a backlight light source means, then a liquid crystal display image whose brightness is extremely higher viewed from the desirous observing direction can be obtained. For example, the liquid crystal display device according to the invention is incorporated in the monitor display means of a portable video camera, then it is possible to display a brighter monitoring image without deteriorating an electric power saving property.

What is claimed is:

1. A light scattering guiding light source device comprising:

a light scattering guide with an emitting directionality including at least one relatively smaller light incident surface region, a relatively larger light output surface region for outputting an emitting light, and a volume region having a uniform scattering power given by a refractive index ununiformity structure with a correlation distance "a" ranging from 0.01 $\mu$m to 50 $\mu$m in a correlation function $\gamma(r)=\exp(-r/a)$ for the refractive index ununiformity structure within said volume region so that a forward scattering property is secured in said volume region, where "r" is a distance between two points in said volume region;

a light supply source to provide an incident light on the light incident surface region;

a scattering light emitting direction correcting element provided with a prism surface for correcting a scattering light emitting direction characteristic and being disposed along the light output surface region of the light scattering guide so as to direct the prism surface toward the light output surface region; and a reflector disposed along an opposite surface to the light output surface region, the reflector having a regular reflection property to prevent said emitting directionality from being weakened, wherein a thickness in a direction vertical to the light output surface region of the light scattering guide has a tendency to be reduced with an increase of a distance from the light incident surface region.

2. A liquid crystal display having a liquid crystal panel and a light scattering guiding light source device arranged behind the liquid crystal panel as a backlight, comprising:

a light scattering guide with an emitting directionality including at least one relatively smaller light incident surface region, a relatively larger light output surface region for outputting an emitting light, and a volume region having a uniform light scattering power given by a refractive index ununiformity structure with a correlation distance "a" ranging from 0.01 $\mu$m to 50 $\mu$m in a correlation function $\gamma(r)=\exp(-r/a)$ for the refractive index ununiformity structure within said volume region so that a forward scattering property is secured in said volume region, where "r" is a distance between two points in said volume region;

a light supply source to provide an incident light on the light incident surface region; and a scattering light emitting direction correcting element provided with a prism surface for correcting a scattering light emitting direction characteristic and being disposed along the light output surface region of the light scattering guide so as to direct the prism surface toward the light output surface region; and a reflector disposed along an opposite surface to the light output surface region, the reflector having a regular reflection property to prevent said emitting directionality from being weakened, wherein a thickness in a direction vertical to the light output surface region of the light scattering guide has a tendency to be reduced with an increase of a distance from the light incident surface region.

* * * * *